United States Patent
Hagiwara

(10) Patent No.: US 8,497,911 B2
(45) Date of Patent: Jul. 30, 2013

(54) IMAGING DEVICE, IMAGING METHOD AND PROGRAM FOR CHANGING A BANDWIDTH REQUIREMENT FOR TRANSMITTING AN IMAGE

(75) Inventor: Shigeru Hagiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 12/609,146

(22) Filed: Oct. 30, 2009

(65) Prior Publication Data
US 2010/0110218 A1    May 6, 2010

(30) Foreign Application Priority Data
Oct. 31, 2008    (JP) ................ P2008-281163

(51) Int. Cl.
*H04N 5/228* (2006.01)
(52) U.S. Cl.
USPC ............... 348/207.1; 348/207.11; 348/294
(58) Field of Classification Search
USPC .......... 348/222.1, 229.1, 230.1, 294–394
See application file for complete search history.

(56) References Cited

U.S. PATENT DOCUMENTS

| | | | |
|---|---|---|---|
| 2003/0197800 A1* | 10/2003 | Petrick et al. | 348/308 |
| 2005/0078193 A1* | 4/2005 | Ing et al. | 348/222.1 |
| 2006/0023095 A1* | 2/2006 | Rossi | 348/301 |
| 2006/0244840 A1* | 11/2006 | Eshet et al. | 348/222.1 |
| 2008/0049118 A1* | 2/2008 | Strandwitz et al. | 348/222.1 |

FOREIGN PATENT DOCUMENTS

| | | |
|---|---|---|
| JP | 2004-64300 | 2/2004 |
| JP | 2005-6286 | 1/2005 |
| JP | 2006-311519 | 11/2006 |

* cited by examiner

*Primary Examiner* — Chieh M Fan
*Assistant Examiner* — Dwight C Tejano
(74) *Attorney, Agent, or Firm* — Frommer Lawrence & Haug LLP; William S. Frommer

(57) ABSTRACT

An imaging device, which includes: an imaging section which photoelectrically converts an optical image of an object and generates an image signal; an outputting section which outputs the image signal generated by the imaging section to a transmission path; a driving section which drives the imaging section to generate the image signal; and a controlling section which drives the driving section to cause the imaging section to generate the image signal in a predetermined exposure time and reduces an image rate for the image signal generated by the imaging section so as to narrow a bandwidth necessary for transmission of the image signal.

5 Claims, 8 Drawing Sheets

IMAGING DEVICE, IMAGING METHOD AND PROGRAM FOR CHANGING A BANDWIDTH REQUIREMENT FOR TRANSMITTING AN IMAGE

BACKGROUND OF THE INVENTION

1. Field of the Invention

The present invention relates to an imaging device, an imaging method and a program. More particularly, the invention generates an image signal in a predetermined exposure time in an imaging section and narrows a bandwidth necessary for transmitting the image signal by reducing an image rate for the image signal.

2. Description of the Related Art

Recently, an amount of image data is increasing as the number of pixels in an image sensor becomes large. It has therefore become a realistic phenomenon that the maximum transmission band is fully occupied by data of high-speed image output. An approach to avoid this phenomenon is to reduce the amount of image data by compressing the image data. Another approach is to narrow the bandwidth necessary for transmission of uncompressed image data from a camera. In order to narrow the bandwidth, a one-field image is obtained from a trigger signal input into the camera only when necessary (see, for example, Japanese Unexamined Patent Application Publication No. 10-322604). Alternatively, the image size may be reduced to narrow the necessary bandwidth.

SUMMARY OF THE INVENTION

It is necessary, however, to transmit uncompressed highly precise images to provide images deserve to be viewed or to use an imaging device as a camera that provides machine vision for image processing, including article inspection. In these applications, it is not suitable to transmit the images in a compressed state.

Images may be acquired with trigger signals input only when necessary. In this case, a device for generating the trigger signals should be provided separately. If plural cameras are provided, a system may become complicated. Further, a system may be developed for generating timing to control the trigger signals.

An image size may be reduced to narrow the necessary bandwidth. In this case, a photographed image should be once stored in a memory of the camera and then output in a smaller image size. Accordingly, the memory for storing the image should be provided.

It is therefore desirable to provide an imaging device, an imaging method and a computer program for easily transmitting an image photographed in a predetermined exposure time.

A first embodiment of the invention is an imaging device which includes: an imaging section which photoelectrically converts an optical image of an object and generates an image signal; an outputting section which outputs the image signal generated by the imaging section to a transmission path; a driving section which drives the imaging section to generate the image signal; and a controlling section which drives the driving section to cause the imaging section to generate the image signal in a predetermined exposure time and reduces an image rate for the image signal generated by the imaging section so as to narrow a bandwidth necessary for transmission of the image signal in the transmission path.

In the present embodiment of the invention, the imaging section reads electric charge carriers accumulated in a time period beginning with completion of sweeping out of electric charge carriers accumulated by photoelectric conversion until the elapse of the exposure time and generates the image signal. The controlling section reduces the image rate for the image signal generated by the imaging section from the predetermined image rate in response to the resending request issued by an output destination of the image signal. For example, the controlling section increases an interval between events of sweeping out of the accumulated electric charge carriers so as to reduce an image rate for the image signal. In a case in which no resending request has been issued, the imaging device increases the image rate if the image rate has been reduced lower than a predetermined image rate.

A second embodiment of the invention is an imaging method which includes the steps of: photoelectrically converting an optical image of an object in an imaging section and generating an image signal; outputting the generated image signal from an outputting section to a transmission path; and causing the imaging section to generate the image signal in a predetermined exposure time and reducing an image rate for the image signal generated by the imaging section so as to narrow a bandwidth necessary for transmission of the image signal in the transmission path.

A third embodiment of the invention is a program which causes a computer incorporated in an imaging device to implement functions of: photoelectrically converting an optical image of an object in an imaging section and generating an image signal; outputting the image signal generated by the imaging section from an outputting section to a transmission path; and causing the imaging section to generate the image signal in a predetermined exposure time and reducing an image rate for the image signal generated by the imaging section so as to narrow a bandwidth necessary for transmission of the image signal in the transmission path.

The program according to the present embodiment of the invention is stored in advance in a computer incorporated in an imaging device. The program according to the present embodiment of the invention may be provided by a computer-readable storage medium, a communication medium, a storage medium, such as an optical disc, a magnetic disc and a semiconductor memory, or a communication medium, such as a network. Alternatively, the program according to the present embodiment of the invention may be updated from a program stored in the computer incorporated in the imaging device.

According to the embodiments of the invention, an image signal is generated in a predetermined exposure time in an imaging section and a bandwidth necessary for transmitting the image signal is narrowed by reducing an image rate for the image signal generated by the imaging section. With this configuration, a load of the transmission path which transmits the image signal can be lightened and, if the bandwidth which can be used for transmission of image is narrow, an image photographed in a predetermined exposure time can be transmitted easily.

DESCRIPTION OF THE PREFERRED EMBODIMENTS

Figure 1:
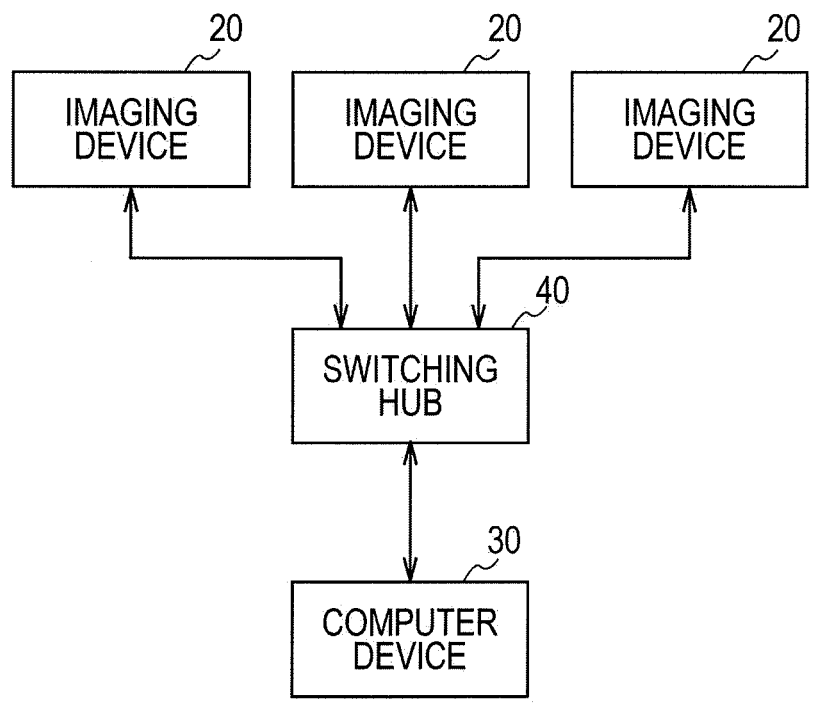
FIG. 1 illustrates a configuration of an imaging system.

The best mode for implementing the invention (hereinafter, referred to as an "embodiment") will be described below. Description will be given in the following order.
1. Configuration of Imaging System
2. Configuration of Imaging Device
3. Operation of Imaging Device
1. Configuration of Imaging System FIG. 1 illustrates a configuration of an imaging system. An imaging system 10 includes one or more imaging devices 20, a computer device 30 and a switching hub 40. The computer device 30 displays an image using image data output from the imaging device(s) 20. The switching hub 40 may be, for example, a network repeater. The switching hub 40 analyzes header information of packets supplied from the imaging device 20 and the computer device 30 and transmits the supplied packets to a transmission destination device. For example, when packets transmitted to the computer device 30 as a destination is supplied from the imaging device 20, the switching hub 40 transmits the packets to the computer device 30. When packets transmitted to one of the imaging devices 20 as a destination is supplied from the computer device 30, the switching hub 40 transmits the packets to the imaging device 20 designated by the transmission destination.

Figure 2:
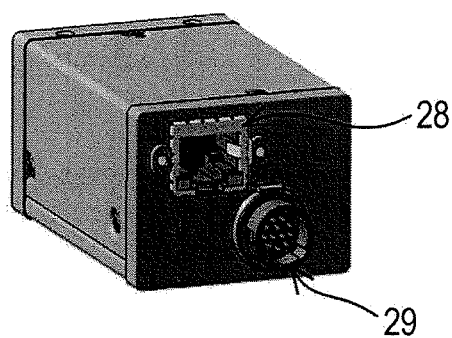
FIG. 2 is an exterior view of an imaging device.
Figure 3:
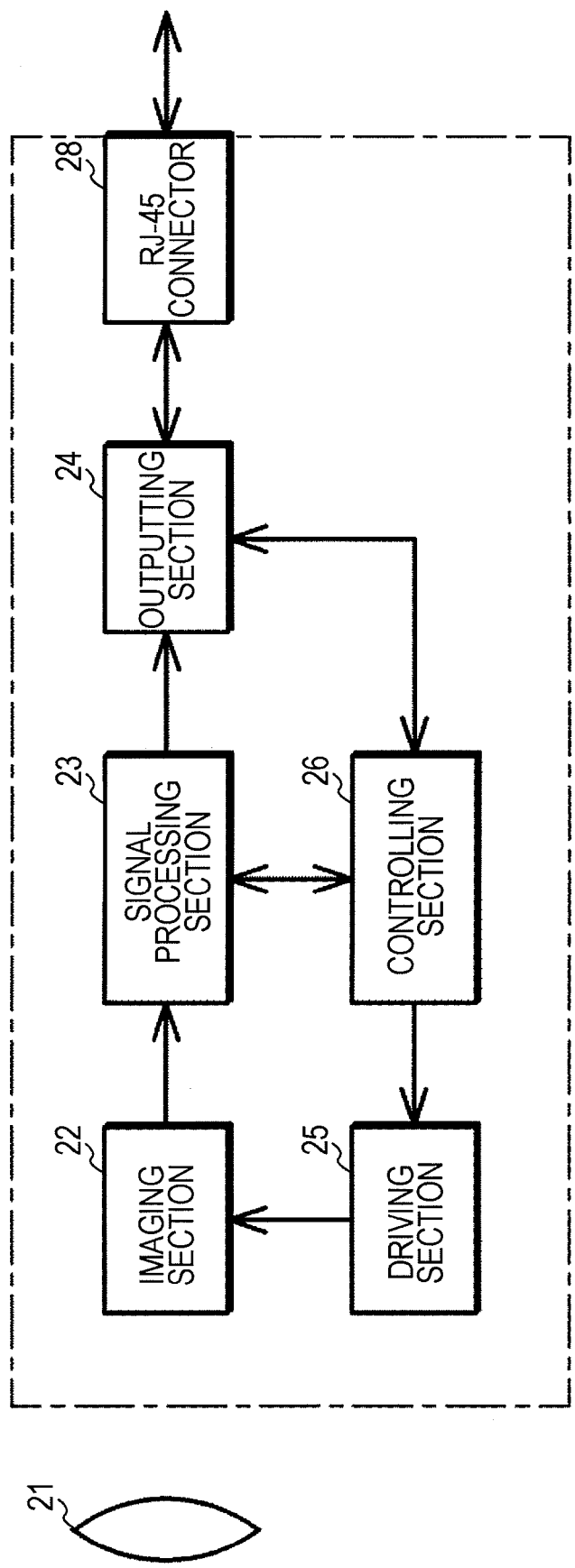
FIG. 3 is a block diagram of a functional configuration of the imaging device.

FIG. 2 is an exterior view of the imaging device 20. The imaging device 20 includes an RJ-45 connector 28 for connecting to a network and a connector 29 through which power is supplied to the imaging device 20. The imaging device 20 transmits an image signal via the RJ-45 connector 28 on the basis of an international standard "IEEE802.3ab (1000 BASE-T)." A transmission band of the IEEE802.3ab (1000 BASE-T) is 1 G bps. For a user datagram protocol/Internet protocol (UDP/IP) communication is to be established, however, a bandwidth that can be used for the transmission of the image signal is about 950 M bps with a UDP header and an IP header being removed from packets to be transmitted. The imaging device 20 reduces the image rate, such as a frame rate or a field rate, for the image signal so as to reduce the network load. In the following description, reduction in the image rate, such as the frame rate, for the image signal will be illustrated.
2. Configuration of Imaging Device FIG. 3 is a block diagram of a functional configuration of the imaging device. A lens 21 forms an optical image of an object on an imaging surface of an imaging section 22. The imaging section 22 includes a charge coupled device (CCD) image sensor or a complementary metal oxide semiconductor (CMOS) image sensor. The imaging section 22 drives an image sensor on the basis of a driving signal supplied from a driving section 25 described later. The driven image sensor accumulates electric charge carriers generated by photoelectric conversion of the optical image and reads the accumulated electric charge carriers out so as to generate an electrical signal. The imaging section 22 removes noise from the generated electrical signal and converts an analog electrical signal into a digital signal, and then outputs the digital signal to a signal processing section 23 as an image signal.

The signal processing section 23 executes various signal processes to the image signal, including brightness adjustment, color correction and outline correction. The signal processing section 23 outputs the image signal after the signal processes to an outputting section 24.

The outputting section 24 supplies the image signal supplied from the signal processing section 23 to an external device via a transmission path. For example, the outputting section 24 packetizes an image signal and adds header information to the packetized image signal, and outputs the packetized image signal via a cable connected to the RJ-45 connector 28. The header information includes addresses of a transmission destination and a transmission origin and a packet ID which indicates the order of the packets.

The driving section 25 generates a driving signal on the basis of the control signal supplied from a controlling section 26 described later and supplies the generated driving signal to the imaging section 22. The driving section 25 thus controls generation of the image signal. The driving section 25 generates signals, such as an electric charge sweeping out signal and a reading signal, as a driving signal. The electric charge sweeping out signal is a signal for sweeping out electric charge carriers accumulated in the image sensor. The reading signal is a signal for reading electric charge carriers accumulated in the image sensor and generating an electrical signal. An electric charge storage period between the electric charge sweeping out signal and the reading signal corresponds to the exposure time.

The controlling section 26 generates a control signal and supplies the generated control signal to each part of the imaging device 20 so that the imaging device 20 operates in a desired manner. The controlling section 26 reduces the image rate for the image signal generated by the imaging section 22 so as to narrow the transmission band necessary for the transmission of the image signal. For example, when the amount of data flowing into a network on the basis of the IEEE802.3ab (1000 BASE-T) increases to fully occupy the transmission band, the image rate for the image signal is reduced and the transmission band necessary for transmission of the image signal is narrowed.
3. Operation of Imaging Device Next, an operation of the imaging device 20 will be described with reference to FIG. 4. (A) in FIG. 4 describes an electric charge sweeping out signal φSUB. The electric charge sweeping out signal φSUB is a signal applied to a semiconductor substrate of the image sensor in order to sweep out the electric charge carriers accumulated by photoelectric conversion from the image sensor. The pulse voltage of the electric charge sweeping out signal φSUB is, for example, 20V to 30V. The driving section 25 sweeps out the electric charge carriers accumulated in the semiconductor substrate of the image sensor toward the substrate with the voltage of 20V to 30V applied by the electric charge sweeping out signal φSUB.

Figure 4:
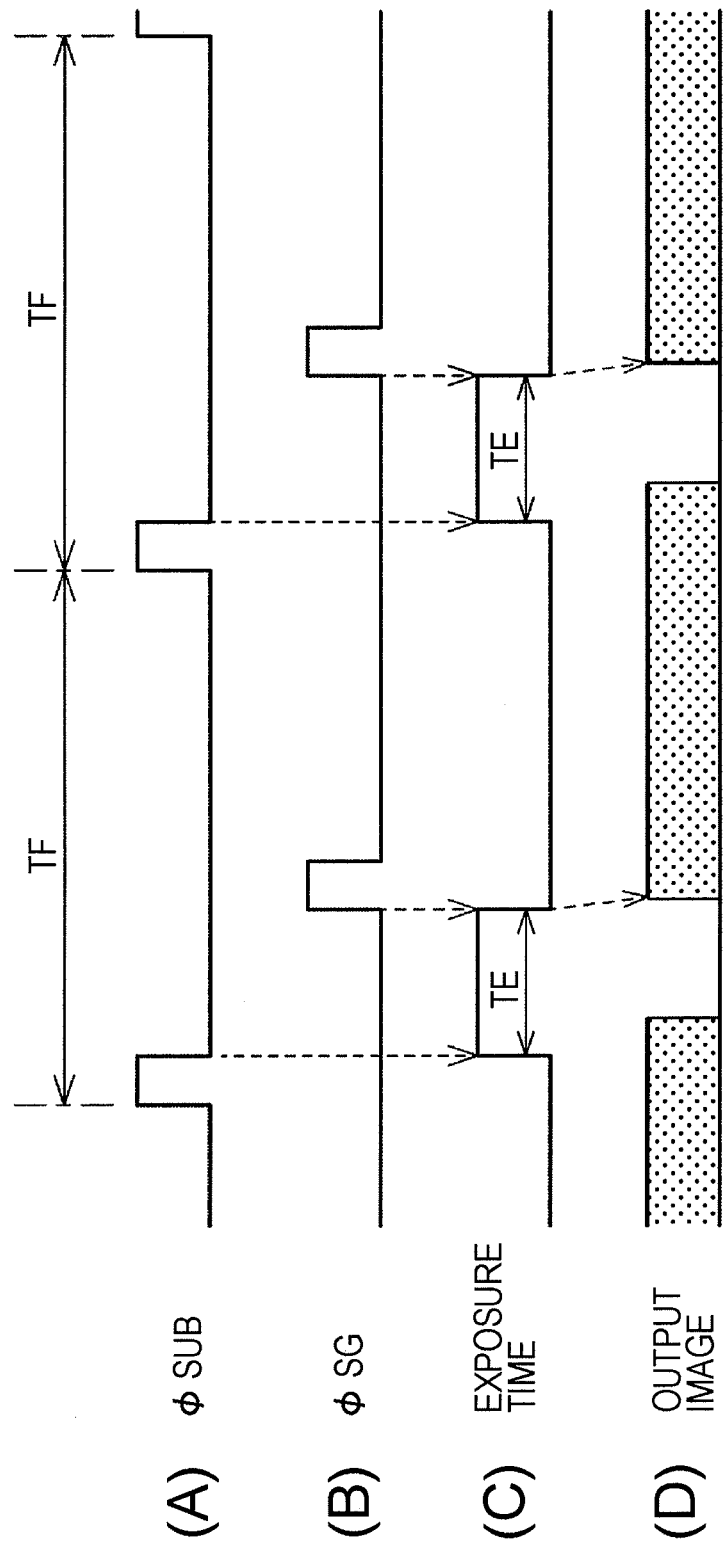
FIG. 4 illustrates an operation of the imaging device.

(B) in FIG. 4 describes a reading signal φSG for reading the accumulated electric charge out. The driving section 25 supplies the reading signal φSG to the imaging section 22 where the image signal in accordance with the electric charge carriers accumulated in the image sensor is generated.

The imaging section 22 starts sweeping out of the electric charge at a leading edge of the electric charge sweeping out signal φSUB and completes sweeping out of the electric charge at a trailing edge of the electric charge sweeping out signal φSUB. The electric charge carriers are thus accumulated. The imaging section 22 reads the accumulated electric charge carriers at the leading edge of the reading signal φSG and generates the image signal in accordance with the read electric charge carriers. Accordingly, a period between the trailing edge of the electric charge sweeping out signal φSUB and the leading edge of the reading signal φSG corresponds to an exposure time TE of the image sensor as described in (C) in FIG. 4.

As illustrated in (D) in FIG. 4, an outputting section 24 outputs the image signal generated on the basis of the electric charge carriers read by the reading signal φSG illustrated in (B) in FIG. 4.

Next, generation of the electric charge sweeping out signal φSUB by the driving section 25 will be described with reference to FIG. 5. (A) in FIG. 5 describes a horizontal transfer clock signal HCK. The driving section 25 makes a count synchronized with the horizontal transfer clock signal HCK and obtains a counter value CTp as illustrated in (B) in FIG. 5. When the counter value CTp becomes "u," for example, the driving section 25 rises the electric charge sweeping out signal φSUB at the leading edge of the subsequent horizontal transfer clock signal HCK as illustrated in (C) in FIG. 5. Then, after the electric charge sweeping out period is elapsed, the electric charge sweeping out signal φSUB is fallen. When the counter value CTp becomes "v," the driving section 25 resets the counter value CTp to "0" at the leading edge of the horizontal transfer clock signal HCK.

The driving section 25 continuously makes a count synchronized with the horizontal transfer clock signal HCK and, when the counter value becomes "u," the driving section 25 starts the electric charge sweeping out signal φSUB at the leading edge of the following horizontal transfer clock signal HCK. By repeating this process, an image can be output with one frame period TF being set to "(v+1)×Thck." "Thck" is one period cycle of the horizontal transfer clock signal HCK.

The driving section 25 further changes the counter value (hereinafter a "count reset value") RC for resetting the counter value CTp on the basis of the control signal from the controlling section 26 and changes one frame period. The driving section 25 changes the count reset value RC into "v+s" from "v" on the basis of the control signal from the controlling section 26. "s" refers to a rate adjustment value RS.

Figure 5:
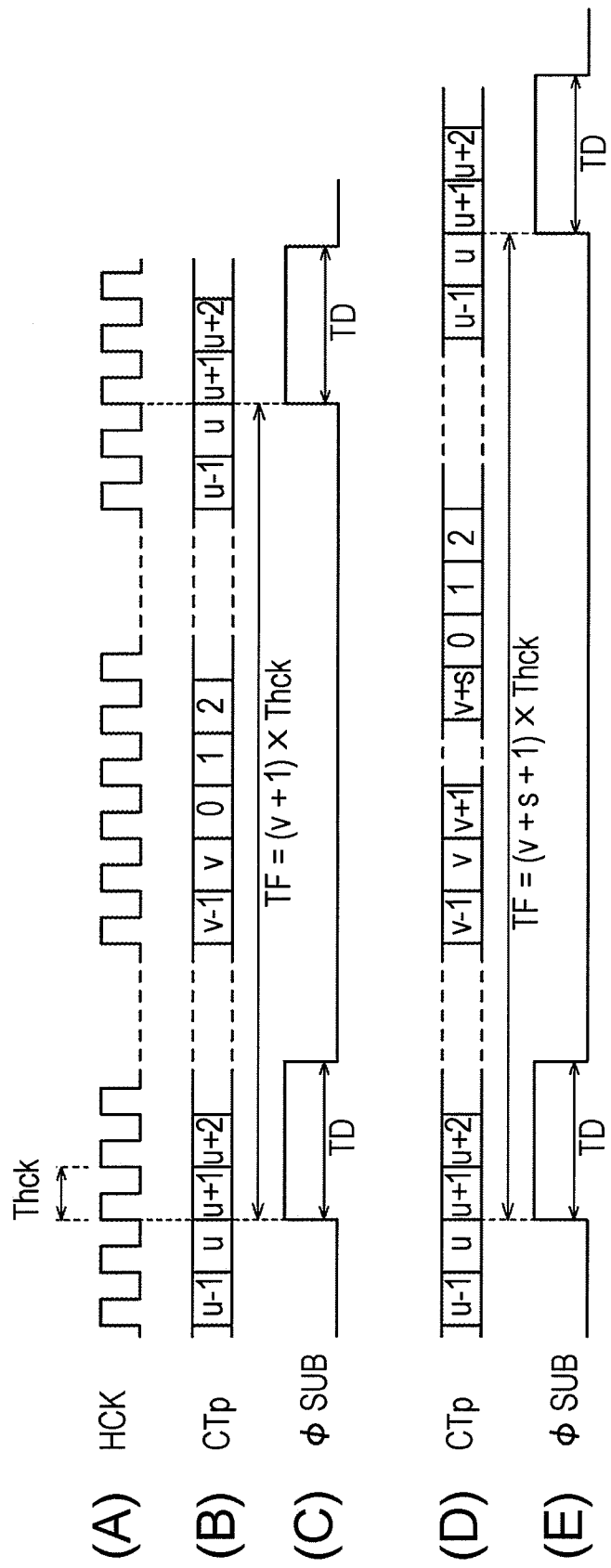
FIG. 5 illustrates generation of an electric charge sweeping out signal φSUB.

(D) in FIG. 5 describes the counter value CTp when the count reset value RC is changed to "v+s" from "v." When the count reset value RC is changed to "v+s" from "v", one frame period is changed to "(v+s+1)×Thck" from "(v+1)×Thck" as illustrated in (E) in FIG. 5. The frame rate of the image signal is thus reduced. When the horizontal transfer clock is 36 MHz, for example, it is only necessary to set a value of the rate adjustment value RS to "s=36×16×1000000=576000000" in order to increase the one frame period to as long as 16 seconds. Here, since the rate adjustment value RS can be set up for each unit, the frame period can be controlled for each cycle of the horizontal transfer clock signal HCK. That is, the frame rate can be controlled precisely and easily by changing the count reset value RC which is the counted value for resetting the counter value CTp.

Figure 6:
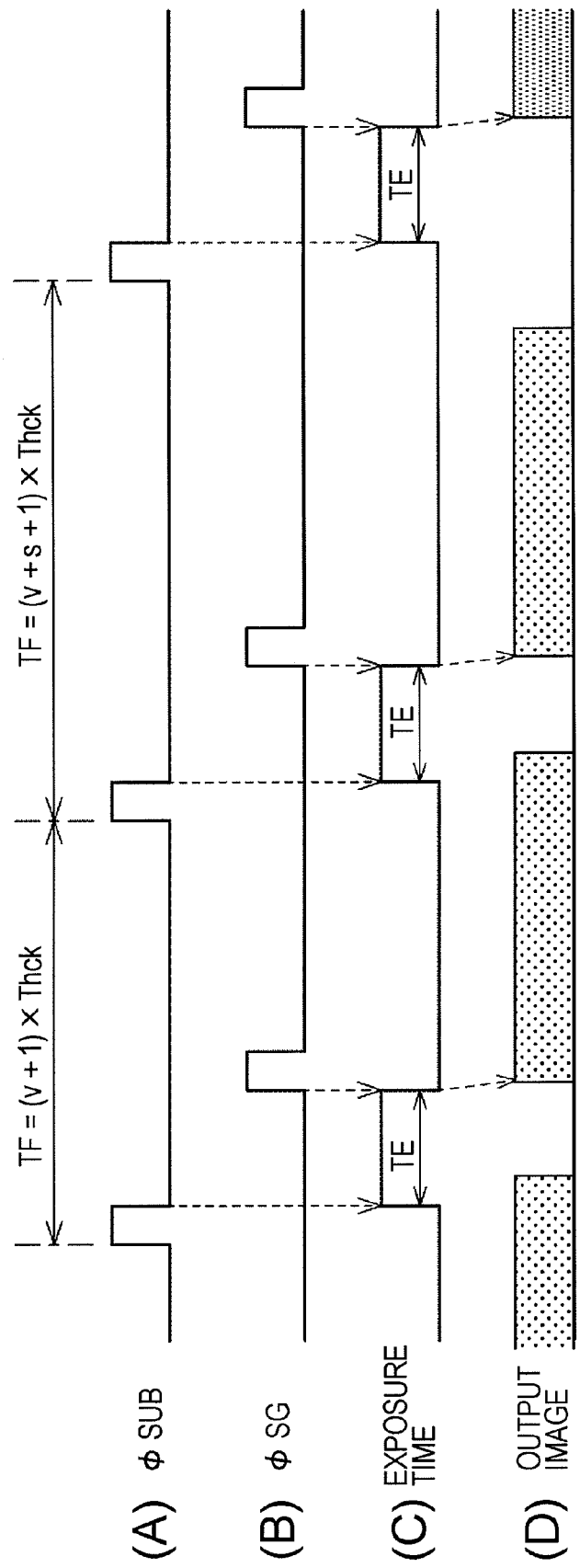
FIG. 6 illustrates changing in a frame rate.

When the count reset value RC is changed to "v+s" from "v" with a constant exposure time TE, i.e., a period between the trailing edge of the electric charge sweeping out signal φSUB and the leading edge of the reading signal φSG, an interval (i.e., a frame period) at the leading edge of the electric charge sweeping out signal φSUB is switched to "(v+s+1)×Thck" from "(v+1)×Thck" as illustrated in (A) in FIG. 6. The reading signal φSG is started after the exposure time TE elapsed from the trailing edge of the electric charge sweeping out signal φSUB as illustrated in (B) in FIG. 6. Accordingly, the bandwidth necessary for transmission of the image signal can be reduced without shortening the exposure time.

The rate adjustment value RS may be set up by a user or may be set up automatically. If the rate adjustment value RS can be set up by the user, the image signal can be output at a desired frame rate without shortening the exposure time. If the rate adjustment value RS is set up in accordance with a degree of congestion of the transmission path in which the image signal is transmitted, the transmission path necessary for transmitting the image signal can be narrowed in accordance with the degree of congestion of the transmission path by increasing the value of the rate adjustment value RS when the degree of congestion is large.

Figure 7:
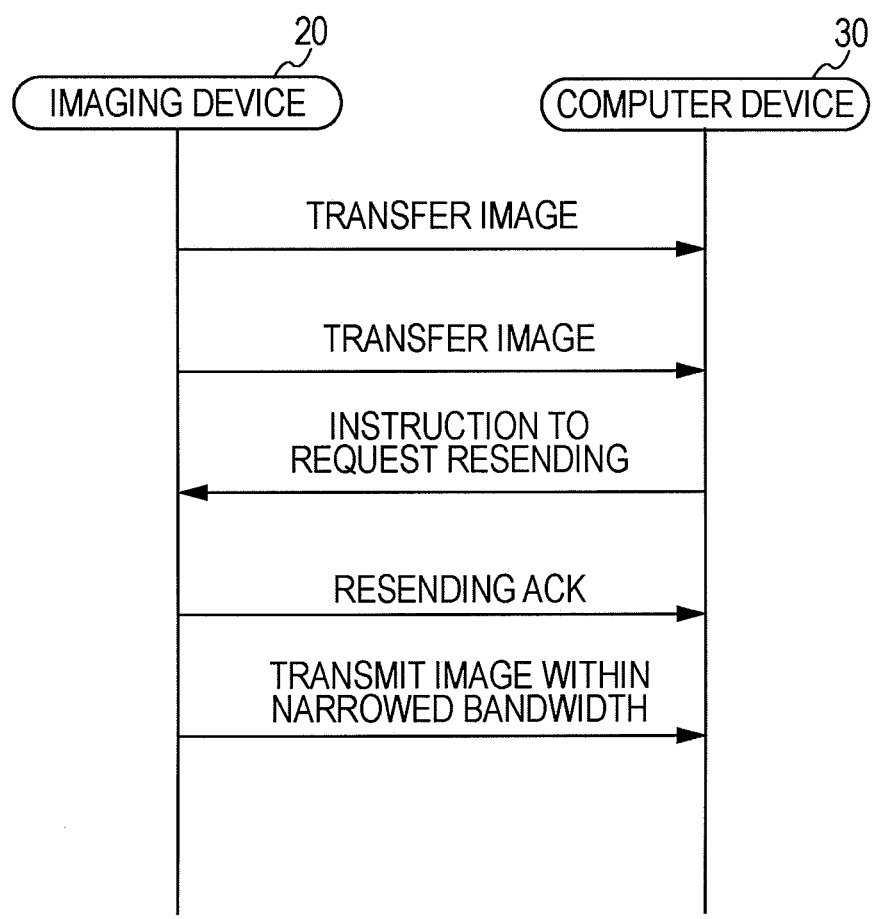
FIG. 7 illustrates a transmission sequence of images from the imaging device to a computer device.

Next, an operation for adjusting the frame rate in accordance with the degree of congestion of the transmission path will be described. FIG. 7 illustrates a transmission sequence of images from the imaging device 20 to a computer device 30.

The imaging device 20 usually transmits images at the predetermined maximum frame rate and reduces the frame rate when no unoccupied bandwidth is left. The imaging device 20 transmits uncompressed images at 15 frames per second and at a 12-bit gradient using the image sensor having 2448 pixels in horizontal direction and 2048 pixels in vertical direction, for example. In this case, the bandwidth necessary for transmission of the uncompressed image is 2448×2048×15×12=902.4M bps. That is, when an uncompressed image is transmitted via a network having a transmission band of 1 G bps and if an image is transmitted by UDP/IP communication via a network having a transmission band of 1 G bps, the bandwidth that can be used for the transmission of the image signal as described above is about 950 M bps and therefore the image is transmitted within the full bandwidth.

The imaging device 20 packetizes the image signal and adds, to each packet, header information including the packet ID which indicates the order of the packets and then outputs the packetized image signal. The computer device 30 can reproduces one-frame image using the image signal divided into packets in a correct order by reading the packet ID of the packets transmitted from the imaging device 20. Accordingly, even if the packets do not arrive at the computer device 30 in a transmitted order, one-frame image can be reproduced through rearrangement of the order of the packets on the basis of the packet ID.

Figure 8:
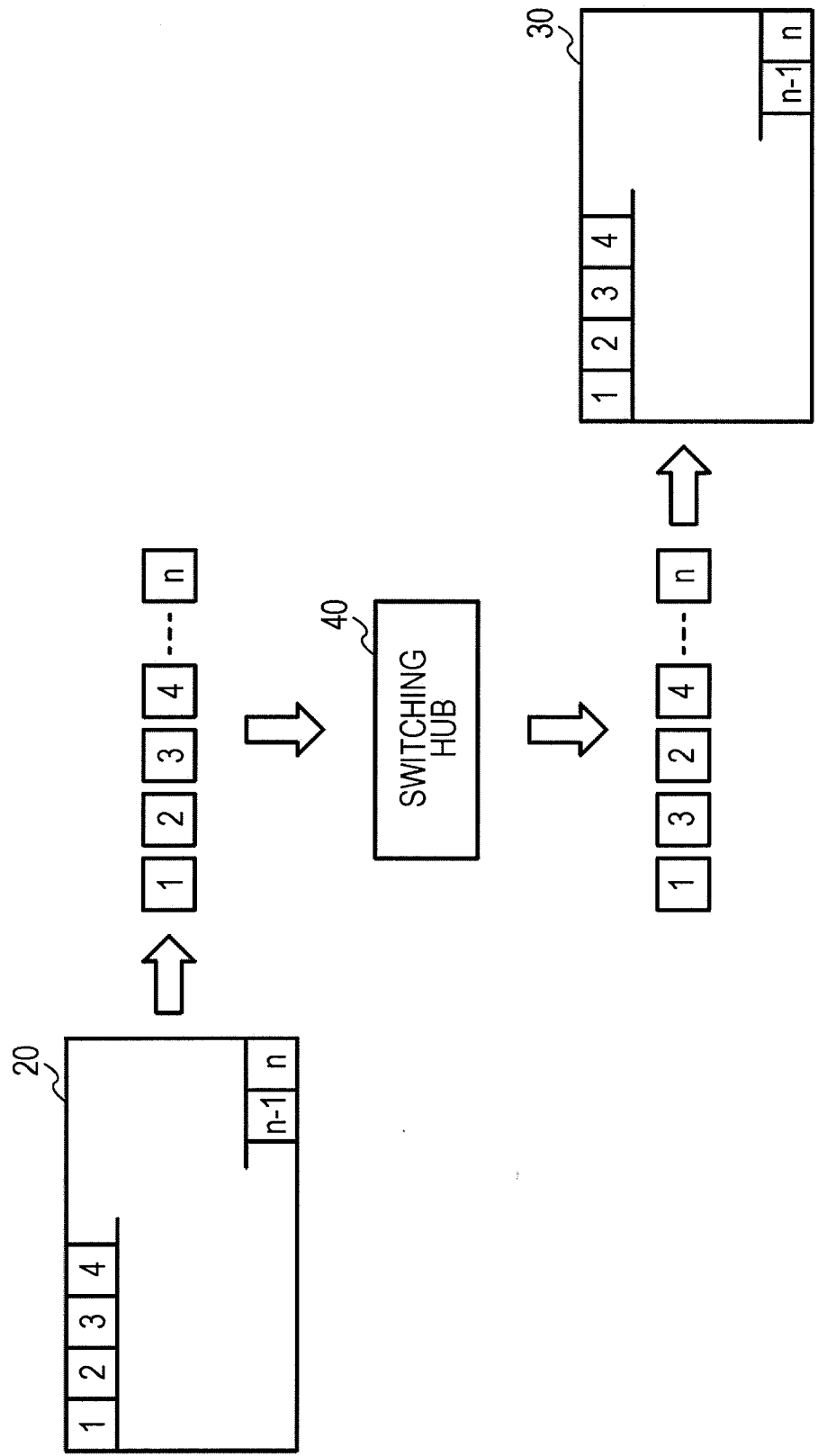
FIG. 8 illustrates an instance in which packets are supplied to the computer device in a changed order.

FIG. 8 illustrates an instance in which packets are supplied to the computer device 30 in a changed order. The imaging device 20 divides the one-frame image into n packets and transmits the same to the computer device 30 in the order of from "1" to "n."

The switching hub 40 determines the transmission destination from the header information of the supplied packets and transmits the packets to the determined transmission destination. When the packets are supplied from plural imaging devices 20 or another device, the switching hub 40 keeps the supplied packets temporarily and then arranges and transmits the packets. Accordingly, the packets supplied to the switching hub 40 may be transmitted in a changed order. For example, when the packets are supplied in an order of "1", "2", "3" and "4" from the imaging device 20, the packets may be arranged and transmitted to the computer device 30 in the order of "1", "3", "2" and "4." Since the computer device 30 recognizes the correct order of the image signals divided into packets by reading the packet ID even if the packets are transmitted in a changed order, the computer device 30 can reproduce the one-frame image.

When the switching hub 40 arranges the packets, if the bandwidth becomes congested with the images transmitted at the maximum frame rate from the plural imaging devices 20, the packets sequentially transmitted from the imaging device 20 may delay in arriving at the computer device 30. In such a case, the computer device 30 issues a resending request command to the imaging device 20 which is the transmission origin of the packets that have not been arrived. Upon reception of the resending request command, the imaging device 20 returns a resending ACK to the computer device 30 which is the transmission origin of the resending request command. The imaging device 20 then transmits the requested packets. The imaging device 20 determines that the transmission path is congested because the resending request command is issued, and reduces the frame rate for the image signal to narrow the transmission band necessary for transmission of the image signal.

Figure 9:
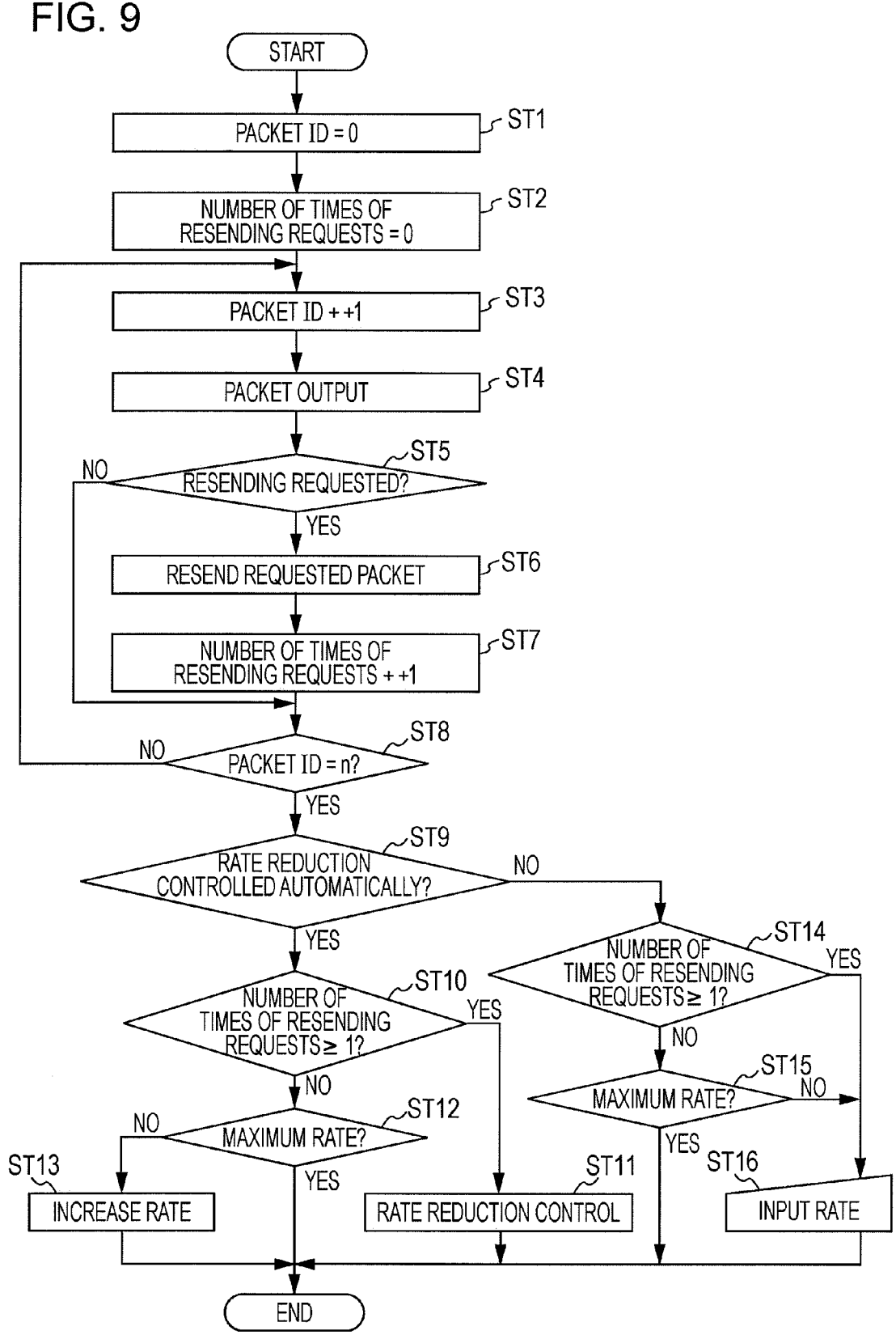
FIG. 9 is a flowchart illustrating a control operation of a transmission band.

FIG. 9 is a flowchart illustrating an operation to adjust a transmission band necessary for transmission of the image signal in the imaging device. In step ST1, the controlling section 26 sets a packet ID to an initial value "0." The outputting section 24 packetizes the image signal supplied from the signal processing section 23, adds header information indicating the transmission destination of the packet and the packet ID to the packetized image signal. The outputting section 24 then outputs the packetized image signal. The controlling section 26 sets the packet ID of the header information added by the outputting section 24 to an initial value "0." The routine proceeds to step ST2.

In step ST2, the controlling section 26 sets the number of the issued resending requests to the initial value "0." The controlling section 26 counts the number of the resending requests issued by the packet transmission destination and controls the frame rate on the basis of the counting result. Here, the controlling section 26 sets the number of the issued resending requests to the initial value "0." The routine proceeds to step ST3.

In step ST3, the controlling section 26 adds "1" to the packet ID to provide a new packet ID. The routine proceeds to step ST4.

In step ST4, the controlling section 26 causes the outputting section 24 to output packets. The routine proceeds to step ST7.

In step ST5, the controlling section 26 determines whether or not a resending request has been issued. When a resending request command is provided by the computer device 30 which is the packet transmission destination, the routine proceeds to step ST6. When no resending request command has been provided, the routine proceeds to step ST8.

In step ST6, the controlling section 26 retransmits requested packets. The controlling section 26 causes the outputting section 24 to output packets indicated by the resending request command provided by the computer device 30. The routine then proceeds to step ST7.

In step ST7, the controlling section 26 adds "1" to the number of the issued resending requests to provide a new number of the issued resending requests. The routine then proceeds to step ST8.

In step ST8, the controlling section 26 determines whether or not the packet ID has been set to "n." Here, "n" indicates the number of packets for one-frame image signal. When the packet ID is not "n," i.e., when the output of the one-frame image signal is not completed, the routine returns to step ST3 where the controlling section 26 adds "1" to the packet ID to provide a new packet ID. Then, the subsequent packet is output. When the packet ID is set to "n," i.e., when the output of the one-frame image signal is completed, the routine proceeds to step ST9.

In step ST9, the controlling section 26 determines whether or not the rate reduction is controlled in an automatic mode. A user can select the mode for controlling the rate reduction between an automatic mode and a manual mode. If the rate reduction control is in the automatic mode, the routine proceeds to step ST10. If the rate reduction control is in the manual mode, the routine proceeds to step ST14.

In step ST10, the controlling section 26 determines whether or not the number of the issued resending requests is one or greater. If the controlling section 26 determines that the number of the issued resending requests is one or greater, the routine proceeds to step ST11. If the controlling section 26 determines that the number of the issued resending requests is less than one, the routine proceeds to step ST12.

In step ST11, the controlling section 26 reduces the rate. The controlling section 26 controls the driving section 25 in order to increase the subsequent frame period by adding the rate adjustment value RS to the count reset value RC so as to generate the electric charge sweeping out signal φSUB and the reading signal φSG.

In step ST12, the controlling section 26 determines whether or not the frame rate is the maximum. If the frame rate is the maximum, the controlling section 26 maintains the current frame period. If the rate is not the maximum, the routine proceeds to step ST13.

In step ST13, the controlling section 26 increases the rate. The controlling section 26 increases the frame rate when the frame rate is lower than the maximum rate in a case in which no resending request has been issued. The controlling section 26 controls the driving section 25 to increase the subsequent frame period by subtracting the rate adjustment value RS from the count reset value RC and generates the electric charge sweeping out signal φSUB and the reading signal φSG with the count reset value RC being set to "v."

The routine proceeds from step ST9 to step ST14, where the controlling section 26 determines whether or not the number of the issued resending requests is one or greater. When the controlling section 26 determines that the number of the issued resending requests is one or greater, the routine proceeds to step ST16. When the controlling section 26 determines that the number of the issued resending requests is smaller than one, the routine proceeds to step ST15.

In step ST15, the controlling section 26 determines whether or not the rate is the maximum. When the frame rate is the maximum, the controlling section 26 maintains the current frame rate. When the frame rate is not the maximum, the routine proceeds to step ST16.

In step ST16, the controlling section 26 causes the user to input the rate. The controlling section 26 generates information with which the user can determine how to change the frame rate. The controlling section 26 supplies the generated information to the computer device 30 from the outputting section 24. The information is displayed on a screen of the computer device 30. For example, the controlling section 26 supplies information including the current frame rate, the maximum frame rate and the number of the issued resending requests to the computer device 30. The information is displayed on the screen of the computer device 30. The user makes an instruction regarding the frame rate or regarding increasing/reducing of the frame rate with reference to the displayed information. The computer device 30 supplies information indicating the user instruction to the imaging device 20. The outputting section 24 of the imaging device 20 supplies the information indicating the user instruction supplied from the computer device 30 to the controlling section 26. The controlling section 26 controls an operation of the driving section 25 on the basis of the information indicating the user instruction and controls the frame rate of the image signal generated by the imaging section 22.

If the frame period does not exceed 16 second, for example, the count reset value RC is smaller than "57600000." The rate adjustment value RS is a variable value that can be controlled externally. When the horizontal transfer clock is 36 MHz, for example, the rate adjustment value RS corresponding to 500 milliseconds is "18000000." When the maximum frame rate is 15 frames per second and a horizontal transfer clock is 36 MHz, the lower limit of the count reset value RC is "(36000000/15)-1=2399999."

In the operation of flowchart illustrated in FIG. 9, the frame rate is reduced by adding the rate adjustment value RS previously set as the count reset value RC when a resending request is issued. The rate adjustment value RS, however, may also be changed in accordance with the number of the issued resending requests. For example, if congestion of the transmission path is large, then the number of the issued resending requests increases. Accordingly, if the number of the issued resending requests is large, the frame rate is reduced more greatly than that with smaller number of the issued resending requests by increasing the rate adjustment value RS. In this manner, by setting the rate adjustment value RS in accordance with the number of the issued resending requests, the frame rate of the image signal generated by the imaging section 22 is changed in accordance with the degree of congestion of the transmission path without shortening the exposure time and the bandwidth necessary for transmission of image signal can be controlled. Alternatively, time difference between the packets to be transmitted and the packets requested to be resent can be determined on the basis of the packet ID. The rate adjustment value RS can be set on the basis of the determined time difference.

Since a transmission path with small transmission band is used, even if an image signal generated by the highest frame rate is not able to be transmitted, the image photographed in a predetermined exposure time can be easily transmitted by reducing the frame rate as described above.

Although the frame rate is controlled in the foregoing embodiment, the field rate may be controlled similarly. Alternatively, updating of the packet ID and responding to the resending request may be performed in the outputting section 24 and the outputting section 24 may notify the controlling section 26 that the resending request is issued to provide the rate control.

As described above, since the imaging section generates the image signal in a predetermined exposure time and the image rate for the image signal generated by the imaging section is reduced from a predetermined image rate so as to narrow the bandwidth necessary for transmission of the image signal, the load of the transmission path can be lightened. Accordingly, if the bandwidth which can be used for transmission of image is narrow, the image photographed in a predetermined exposure time can be transmitted easily. Since it is not necessary to provide a memory for reducing an image and narrowing the bandwidth, the imaging device can be provided in low cost.

The series of processes described above can be implemented by hardware, software or a combination thereof. If the processes are implemented by software, a computer is used as the controlling section 26. A program may be installed in advance in a computer memory to execute the above-described processes. Alternatively, a program previously stored in the computer memory may be updated by a program to execute the above-described processes.

The program may be stored (i.e., recorded) temporarily or permanently in removable recording media, such as a flexible disk, a compact disc read only memory (CD-ROM), a magneto-optical (MO) disc, a digital versatile disc (DVD), a magnetic disc and a semiconductor memory. The program may be installed in the computer from these removable recording media. The program may be provided to the imaging device 20 via a wired or wireless network and may be installed in the computer memory.

The present application contains subject matter related to that disclosed in Japanese Priority Patent Application JP 2008-281163 filed in Japan Patent Office on Oct. 31, 2008, the entire content of which is hereby incorporated by reference. It is to be understood that the foregoing description of the embodiment of the invention is illustrative only and that various modification may be made without departing from the sprit and scope of the invention.

What is claimed is:

1. An imaging device, comprising:
an imaging section which photoelectrically converts an optical image of an object and generates an image signal;
an outputting section which outputs the image signal generated by the imaging section to a transmission path;
a driving section which drives the imaging section to generate the image signal; and
a controlling section which drives the driving section to cause the imaging section to generate the image signal in a predetermined exposure time and reduces an image rate for the image signal generated by the imaging section so as to narrow a bandwidth necessary for transmission of the image signal,
wherein the imaging section reads electric charge carriers accumulated in a time period beginning with completion of sweeping out of electric charge carriers accumulated by photoelectric conversion until the elapse of the exposure time and generates the image signal;
and the controlling section increases an interval between events of sweeping out of the accumulated electric charge carriers so as to reduce an image rate for the image signal.

2. An imaging device, comprising:
an imaging section which photoelectrically converts an optical image of an object and generates an image signal;
an outputting section which outputs the image signal generated by the imaging section to a transmission path;
a driving section which drives the imaging section to generate the image signal; and
a controlling section which drives the driving section to cause the imaging section to generate the image signal in predetermined exposure time and reduces an image rate for the image signal generated by the imaging section so as to narrow a bandwidth necessary for transmission of the image signal,
wherein the controlling section reduces the image rate in accordance with a resending request from an output destination of the image signal.

3. The imaging device according to claim 2, wherein, in a case in which no resending request has been issued, the imaging device increases the image rate if the image rate has been reduced lower than a predetermined image rate.

4. An imaging method, comprising the steps of:
photoelectrically converting an optical image of an object in an imaging section and generating an image signal;
outputting the generated image signal from an outputting section to a transmission path; and
causing the imaging section to generate the image signal in a predetermined exposure time and reducing an image rate for the image signal generated by the imaging section so as to narrow a bandwidth necessary for transmission of the image signal, wherein the causing step reduces the image rate in accordance with a resending request from an output destination of the image signal.

5. A non-transitory storage medium storing a program which causes a computer incorporated in an imaging device to implement functions of:
   photoelectrically converting an optical image of an object in an imaging section and generating an image signal;
   outputting the image signal generated by the imaging section from an outputting section to a transmission path; and
   causing the imaging section to generate the image signal in a predetermined exposure time and reducing an image rate for the image signal generated by the imaging section so as to narrow a bandwidth necessary for transmission of the image signal,
   wherein the causing step reduces the image rate in accordance with a resending request from an output destination of the image signal.

* * * * *